July 29, 1930.  A. JORDAHL  1,771,639
AIR FILTER
Original Filed March 10, 1923
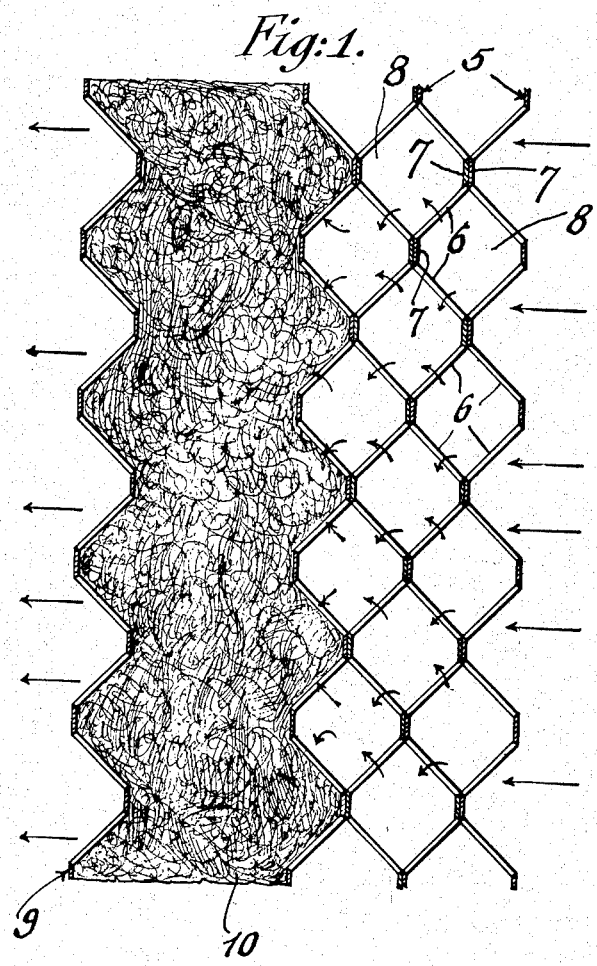
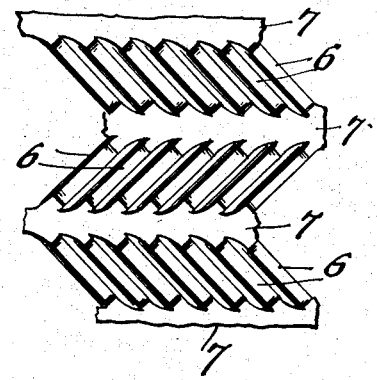
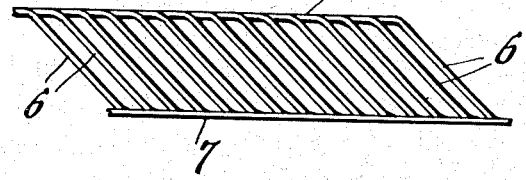
INVENTOR
Anders Jordahl
BY C. P. Goepel
ATTORNEY.

Patented July 29, 1930

1,771,639

UNITED STATES PATENT OFFICE

ANDERS JORDAHL, OF NEW YORK, N. Y., ASSIGNOR TO AMERICAN AIR FILTER COMPANY, INC., OF LOUISVILLE, KENTUCKY, A CORPORATION OF DELAWARE

AIR FILTER

Original application filed March 10, 1923, Serial No. 624,171. Divided and this application filed November 7, 1928. Serial No. 317,730.

This invention relates to air filters, and has for its general object and purpose to provide a novel and inexpensive filter structure for more effectively and efficiently removing dust and other foreign matters or solid impurities from air, gases and the like to be utilized either for purposes of ventilation or in carrying out various industrial processes or operations.

To this end, the subject matter of the present application which constitutes a division of my pending application Serial No. 624,171, filed March 10, 1923, now Patent No. 1,743.675, issued Jan. 14, 1930, in its essentials broadly contemplates the provision of means whereby the air or gas between its point of ingress to the filter and its egress therefrom is subdivided into eddy currents progressively increasing in number and velocity so that by the resultant inertia in the frequent change in direction of such eddy currents, the solid particles of foreign matter are deposited and retained in the filter structure so that the air or gas will leave the filter in a highly purified condition.

It is another object of my invention to provide a filter for accomplishing the above result, in which a mechanical filtering means is employed, so constructed and arranged as to obviate the serious clogging of the filter by dust or dirt after a long continued period of operation.

In one practical embodiment of the invention, this novel filtering means preferably consists of a plurality of baffle elements which may be in the simple and inexpensive form of corrugated expanded metal sheets so arranged relative to each other as to provide a plurality of series of angular baffle vanes forming relatively large voids or pockets between the metal sheets so that initially, the inflowing air or gas is broken up into a number of separate streams or currents, which in their passage through the air pockets cause the larger and heavier particles of foreign matter to be retained within said pockets and upon the walls thereof. At the egress side of the filter, a single sheet of the expanded corrugated metal is arranged and between said sheet and the innermost metal sheet at the opposite side of the filter, mineral wool is positioned. This mineral wool extending into the pockets of the opposing corrugated metal sheets is thereby sustained or supported at spaced points so that it is maintained at a constant uniform density throughout its area. Thus, the initial compression of this mineral wool when it is placed within the filter which determines its resistance to the air or gas flow is also constant and invariable so that the volume of air or gas passing through the filter in any predetermined interval of time may be accurately calculated.

The mineral wool subdivides the air streams into an infinitely greater number of small eddy currents. The velocity of flow of the air or gas through this part of the filter is thereby greatly increased. It will be understood that such a mechanical filter is of the semi-dry type, or in other words, before use, all of the filtering material is thoroughly coated with a suitable viscous solution which acts by adhesion, to securely hold and retain the particles of dust or other solid matter impinged against such surfaces.

With the above and other objects in view, the invention consists in the improved filter and in the form, construction and relative arrangement of its several parts as will be hereinafter more fully described, illustrated in the accompanying drawings, and subsequently incorporated in the subjoined claims.

In the drawings wherein I have shown one simple and practical embodiment of the invention, and in which similar reference characters designate corresponding parts throughout the several views,—

Figure 1 is a fragmentary sectional view through an air or gas filter illustrating the essential characteristics of the present improvements;

Fig. 2 is a fragmentary side elevation of one of the corrugated expanded metal sheets constituting part of the filtering means, and Fig. 3 is an edge view thereof.

Referring in detail to the drawing, it will first be seen from reference to Fig. 1 that at the ingress side of the filter installation, I arrange a plurality of deeply corrugated expanded metal sheets 5 in close abutting contact with each other. Each of these metal sheets or filter elements is expanded and formed to provide regularly spaced baffling vanes 6, the vanes in each series being equidistantly spaced apart and the adjacent series of vanes being obliquely inclined in relatively opposite directions from the intervening parallel strips or sections 7 of the metal sheet which integrally connect the vanes 6 with each other. This construction, results in the formation of relatively deep corrugations between the adjacent series of baffle vanes 6 at each side of the metal sheet.

The expanded corrugated metal sheets 5 at the ingress side of the filter are arranged with the sections 7 of said metal sheets in close abutting contact with each other, thereby providing a filter section of general honeycomb appearance having a series or group of substantially rectangular voids or pockets indicated at 8 bounded by the inclined baffles 6 of adjacent metal sheets.

At the egress side of the filter installation, there is arranged a single expanded and corrugated metal sheet 9 preferably of the same construction as the metal sheets 5. Between this expanded sheet 9 and the opposed metal sheet 5 there is positioned a body of mineral wool 10 which completely fills the space between said metal sheets and between the top, bottom and side walls of the air passage, or the cell casing within which the filtering material may be enclosed and confined.

Generally considered, the use of expanded metal sheets, and steel or mineral wool for air filtering purposes, is not new, but in so far as I am aware, these filtering elements have never before been combined in a filter installation in the manner herein disclosed and to accomplish the purposes and results of this invention.

It is likewise common practice in the art, in the semi-dry type of filter, to immerse this filtering material in a more or less viscous solution whereby the surfaces of the material against which the air currents impinge will be completely coated or covered by the solution and to which the particles of solid matter will adhere. It is however, a well known fact that when steel or mineral wool alone is used as a filtering medium enclosed within a cell between side walls of fine gauge metal screening or other air pervious material, owing to the weight of the liquid coating on the fibers of the material, it will gradually settle leaving a space between the mass and the top wall of the filter cell or air passage. This results in a very appreciable variation in density in the mass from its lower to its upper portion, and therefore, a corresponding variation or non-uniformity in the resistance offered by different areas or sections of said mass to the passage of air therethrough. This serious objection I have succeeded in entirely overcoming by means of the present invention, and also, of course, preventing the passage of unfiltered air through the upper portion of the filter.

Referring now to Fig. 1 of the drawing, it will be noted that the fibrous mass of mineral wool 10 enters and completely fills the corrugations of the spaced metal sheets 5 and 9. Owing to the depth of these corrugations, numerous spaced points of support are provided at each side of the body of mineral wool sufficiently adequate in the aggregate area of supporting contact between said material and the expanded metal sheets to overcome all tendency of the mass to sag or settle by the action of gravity between said metal sheets. Thus, after the material 10 is initially compressed and rendered uniform in density when placed between the expanded metal sheets, such uniformity in density and resistance to air flow of the said material will be maintained throughout the life of the filter.

In operation, it will of course be understood that my new air filtering means as above described may be utilized in a great variety of ways as may be necessitated by the exigencies encountered in different installations. For instance, my invention may be employed in the manner now commonly adopted in this art by mounting and arranging the filtering elements or materials within a cell casing having opposite side walls of wire screening, expanded metal or other reticulated materials, and such cells, sufficient in number to entirely fill the air passage or conduit may be removably mounted in a suitable supporting frame. Since this is a common and well known practice in the art, illustration of such a practical installation, is not required for the purposes of the present explanation.

Regardless of the particular or specific manner of application of my present improvements, it will be apparent that upon the inflow of air or gas at the ingress side of the filter, it will first encounter the series of expanded metal sheets 5. Upon striking against the first group of baffles 6, the air or gas is divided into a large number of separate streams as it passes between the adjacent baffle vanes. In similar manner, these air streams impinge upon the succeeding series of baffle vanes 6 after passing through the intervening voids or pockets 8. By reason of the oblique or angular relation of the baffles with respect to the general path of flow of the air, it is obvious that these air streams must frequently change their direction or course as they pass between the series of baffle vanes and through the intervening voids or pockets 8. With each change in direction of the air streams, the particles of solid foreign matter therein tend to pursue a straight course and by inertia are deposited upon the viscous coated surfaces of the baffles to which they will tenaciously adhere. Thus, the larger particles of dust or other foreign materials in the gas or air will be securely caught and held. By the subdivision of the air into the separate streams or currents, there will of course, be an appreciable increase in velocity of the individual air streams during their passage through the cellular section of the filter formed by the metal sheets 5.

After the air streams have passed through this first section of the filter, they next encounter the fibrous mass of mineral wool 10. The several air streams will here be broken up and subdivided into a great number of eddy currents repeatedly changing their course or direction as they impinge against the individual fibers of the densely packed mass 10. Of course, the voids between adjacent fibers in this mass are very minute, and the velocity of the eddy currents in their passage therethrough, is correspondingly greater than the velocity of the air streams passing through the larger pockets or voids 8 formed by the expanded metal sheets or elements 5. As above noted, the resistance offered to the passage of these eddy air currents throughout the mass of the material 10, is uniform. In this filtering mass and upon the viscous coated individual fibers thereof, the finer or more minute particles of dust are caught and held so that when the air finally passes through the expanded metal sheet 9 at the egress side of the filter, it is practically devoid of suspended foreign matters and is thoroughly clean or purified. The importance of uniformity in its resistance to air flow in the mass of the material 10 will be appreciated when it is considered that in the carrying out of various chemical and industrial processes and operations, it is of first importance to accurately determine the volume of filtered air supplied to the apparatus during a predetermined increment of time. Accordingly, it will be apparent that my present improvements result in the provision of a filtering apparatus which will possess great efficiency and reliability when employed for such purposes.

From the foregoing description, the construction and advantages of my improved air or gas filter as above described will be clearly and fully understood. While my present disclosure, is exceedingly simple and inexpensive to manufacture and install, it likewise presents an entirely satisfactory solution of a serious difficulty heretofore existing in connection with the industrial use of such air filters. As before stated, the present improvements are not concerned with any particular means for the practical application of the novel structural features or principles of the invention to any specific installation, but is inclusive of all adaptations to which the structural characteristics of the filter may be susceptible.

Accordingly, it is to be understood that in practice I reserve the privilege of making all such legitimate changes in the mechanical form and details of the present disclosure, as may be fairly considered as within the spirit and scope of the appended claims.

I claim:

1. In an air and gas filter of the semi-dry type, a cellular section at the ingress side of the filter composed of rigid foraminous filter members cooperating to form a group of air receiving pockets or voids and offering a relatively low resistance to the passage of air, a foraminous member laterally spaced from said filter section, and a contiguous filter section composed of a compressed fibrous mass extending between the latter member and said cellular filter section, one of the filter members of the first named filter section having parts cooperating with said mass to sustain the same and maintain a uniform density thereof, said compressed filter mass presenting a comparatively high resistance to the passage of air.

2. In an air and gas filter of the semi-dry type, a plurality of filtering sections including a cellular section composed of a plurality of metallic foraminous filter members co-operating to form a group of voids or pockets of relatively large area and presenting low resistance to the passage of air, a similar filter member at the egress side of the filter, another of the filter sections consisting of a compressed mass of metallic fibrous material, and said latter member having parts cooperating with said filter mass to sustain the same and maintain the uniform density thereof, said compressed filter mass presenting a comparatively high resistance to the passage of air.

3. In an air and gas filter, spaced rigid metal filtering members arranged in parallel vertical planes and each having a succesison of laterally convergent walls forming comparatively deep corrugations, and each of said walls consisting of uniformly spaced baffle vanes, and a compressed mass of fibrous metallic filtering material interposed between said members and extending into the corrugations thereof whereby said mass is sustained or supported between said convergent walls and maintained at a predetermined uniform density presenting a uniform resistance throughout said mass to the passage of air therethrough.

4. In an air and gas filter of the semi-dry type, a filter structure embodying a plurality of metal sheets constructed and arranged to provide a group of dust entrapping and retaining filter pockets of substantially uniform area, a similar metal sheet spaced from said first named metal sheets at one side thereof, and a viscous coated fibrous material arranged between the opposed spaced metal sheets and thereby confined under pressure and sustained against gravity settling to maintain said material at a constant predetermined uniform density and resistance to the flow of the air or gas.

5. In an air and gas filter of the semi-dry type, a filter structure embodying spaced substantially rigid corrugated metal sheets having foraminous walls each provided with connected vertically and laterally spaced horizontal portions, and a compressible viscous coated material positioned between said metal sheets and having parts extending into the corrugations thereof and sustained by said foraminous walls whereby the filtering mass is maintained in a predetermined uniformly compressed condition to present an invariable and uniform resistance to the flow of the air or gas throughout the area of said mass.

6. In an air and gas filter of the semi-dry type, filtering means offering progressively increasing resistance to the passage of air or gas between the ingress and egress sides of the filter, said means embodying a cellular structure at the ingress side of the filter composed of a plurality of rigid metal filtering members forming a group of air pockets or voids and offering comparatively low resistance to the air flow, and a contiguous filter section of uniform porosity offering an appreciably higher resistance to the passage of air or gas.

In testimony that I claim the foregoing as my invention, I have signed my name hereto.

ANDERS JORDAHL.